US010070354B2

(12) United States Patent
Blosco et al.

(10) Patent No.: US 10,070,354 B2
(45) Date of Patent: Sep. 4, 2018

(54) NOISE FLOOR DEGRADATION DETECTION FOR CO-LOCATED RADIOS

(71) Applicant: Cisco Technology, Inc., San Jose, CA (US)

(72) Inventors: John Martin Blosco, Norton, OH (US); Matthew Aaron Silverman, Richfield, OH (US); John Matthew Swartz, Lithia, FL (US); Joshua David Suhr, Lenexa, KS (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 14/967,483

(22) Filed: Dec. 14, 2015

(65) Prior Publication Data
US 2017/0171772 A1 Jun. 15, 2017

(51) Int. Cl.
*H04W 36/06* (2009.01)
*H04L 1/00* (2006.01)
*H04W 24/08* (2009.01)
*H04W 28/04* (2009.01)
*H04W 36/04* (2009.01)
*H04W 36/30* (2009.01)
(Continued)

(52) U.S. Cl.
CPC .......... *H04W 36/06* (2013.01); *H04L 1/0061* (2013.01); *H04L 41/0816* (2013.01); *H04L 43/0829* (2013.01); *H04W 24/08* (2013.01); *H04W 28/04* (2013.01); *H04W 36/04* (2013.01); *H04W 36/30* (2013.01); *H04W 84/12* (2013.01)

(58) Field of Classification Search
CPC ... H04W 28/04; H04W 28/048; H04W 28/08; H04W 28/0236; H04W 28/0242; H04W 36/04; H04W 36/20; H04W 36/30; H04W 24/08; H04W 84/12; H04W 52/20; H04W 36/08; H04W 36/22; H04L 1/0061; H04L 1/203; H04L 27/3405; H04L 43/0829; H04L 43/0835; H04L 43/0847
See application file for complete search history.

(56) References Cited

U.S. PATENT DOCUMENTS 6,507,744 B1 * 1/2003 Han ..................... H04W 52/12
370/331
8,340,580 B1 * 12/2012 Epstein ................ H04B 1/1027
455/114.2
(Continued)

OTHER PUBLICATIONS

International Search Report dated Feb. 24, 2017 cited in Application No. PCT/US2016/066184, 15 pgs.
(Continued)

*Primary Examiner* — Joshua Kading
(74) *Attorney, Agent, or Firm* — Merchant & Gould P.C.

(57) ABSTRACT

Noise floor degradation detection may be provided. First, an incremental packet loss rate for a secondary radio may be calculated that indicates an impact on packet reception on the secondary radio due to transmissions by a primary radio. The secondary radio and the primary radio may comprise an access point. Next, it may be determined that the incremental packet loss rate is greater than a predetermined value. A configuration of the access point may be changed in response to determining that the incremental packet loss rate is greater than the predetermined value.

16 Claims, 4 Drawing Sheets

(51) Int. Cl.
*H04L 12/26* (2006.01)
*H04L 12/24* (2006.01)
*H04W 36/00* (2009.01)
*H04W 84/12* (2009.01)

(56) References Cited

U.S. PATENT DOCUMENTS

| | | | |
|---|---|---|---|
| 9,497,680 B1* | 11/2016 | Tran | H04W 36/14 |
| 9,503,948 B1* | 11/2016 | Vivanco | H04W 36/08 |
| 2010/0246543 A1* | 9/2010 | Rajkotia | H04L 1/0075 |
| | | | 370/338 |
| 2010/0278117 A1 | 11/2010 | Sharma et al. | |
| 2013/0010719 A1 | 1/2013 | Shapira | |
| 2013/0136018 A1 | 5/2013 | Jeong et al. | |
| 2016/0330670 A1* | 11/2016 | Konno | H04W 36/30 |

OTHER PUBLICATIONS

Osama M. F. Abu-Sharkh et al., "Dynamic Multi-Band Allocation Scheme for a Stand-Alone Wireless Access Point," Department of Communications Engineering, (QBSC), 2012 26th Annual Biennial Symposium on, IEEE, May 28, 2012, pp. 168-173.

* cited by examiner

NOISE FLOOR DEGRADATION DETECTION FOR CO-LOCATED RADIOS

TECHNICAL FIELD

The present disclosure relates generally to noise floor degradation detection.

BACKGROUND

A wireless access point (AP) is a device that allows wireless devices to connect to a wired network using Wi-Fi, or related standards. The AP usually connects to a router (via a wired network) as a standalone device, but it can also be an integral component of the router itself. An AP is differentiated from a hotspot, which may be the physical space where the wireless service is provided.

Noise may be a factor with an AP. Noise floor (NF) and noise factor (F) are measures of degradation of the signal-to-noise ratio (SNR), caused by components in a radio frequency (RF) signal chain. It is a number by which the performance of an amplifier or a radio receiver can be specified, with lower values indicating better performance. The noise factor is defined as the ratio of the output noise power of a device to the portion thereof attributable to thermal noise in the input termination at standard noise temperature $T_0$ (usually 290 K). The noise factor is thus the ratio of actual output noise to that which would remain if the device itself did not introduce noise, or the ratio of input SNR to output SNR.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
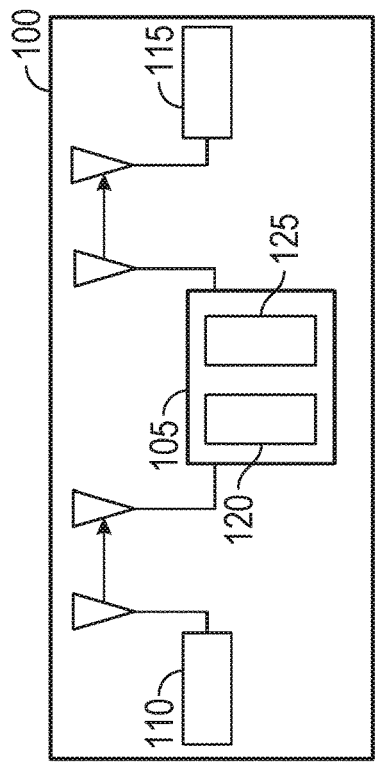
FIG. 1A, FIG. 1B, FIG. 1C, and FIG. 1D show an access point operating environment.

Noise floor degradation detection may be provided. First, an incremental packet loss rate for a secondary radio may be calculated that indicates an impact on packet reception on the secondary radio due to transmissions by a primary radio. The secondary radio and the primary radio may comprise an access point. Next, it may be determined that the incremental packet loss rate is greater than a predetermined value. A configuration of the access point may be changed in response to determining that the incremental packet loss rate is greater than the predetermined value.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

For co-located radios (e.g., dual radios), embodiments of the disclosure may provide an estimate for cross radio driven errors (e.g., cyclic redundancy check (CRC) errors) in order to better manage clients associated with each radio and power allocation for each radio. Embodiments of the disclosure may allow for co-located, same-band radios without expensive isolation or radio frequency (RF) sectorization.

Embodiments of the disclosure may support dual radio (e.g., 5 GHz) operation within an access point. Embodiments of the disclosure may provide highly localized (e.g., 1,000 sq. ft.) extra capacity where/when needed. For example, a client may come online in a specific high density area such as in a lecture hall or meeting room. One problem with having two closely located radios both operating simultaneously in a band (e.g., the 5 GHz band) may be managing the signal-to-interference-plus-noise ratio (SINR) of received packets. Problems may occur when one of the dual radios is transmitting while the other is trying to receive. The receiving radio may have a severely degraded noise floor, even if the transmitting radio is operating, for example, 100s of MHz away. This problem may be apparent for clients that are farther away because their signal relative to the degraded noise floor is worse. To address the noise floor degradation problem, one solution may be to turn the power of each radio's transmit (Tx) all the way down to lessen the noise floor degradation. However, this may result in reduced range for the cell.

Consistent with embodiments of the disclosure, one radio (e.g., a primary radio) of the dual radio may be operated at the normal radio resource management (RRM) defined power to cover a full cell (e.g., a macro cell.). A second radio (e.g., a secondary radio) of the dual radio may be operated at a reduced power (e.g., the lowest possible Tx power) in order to address a smaller high density area (e.g., a micro cell) within the macro cell. This may allow the full coverage of the macro cell by the primary radio and additional capacity delivered to a location that may need it covered by the micro cell. However, because the primary radio may be operating at high power, clients associated to the secondary radio at the edge of the secondary radio's cell (e.g., the micro cell) may encounter problems sending packets to the secondary radio. Embodiments of the disclosure may provide a solution to mitigate the secondary radio's edge connection problem.

FIG. 1A, FIG. 1B, FIG. 1C, and FIG. 1D show an access point operating environment 100. As shown in FIG. 1A, FIG. 1B, FIG. 1C, and FIG. 1D, access point operating environment 100 may comprise an access point 105, a first client 110, and a second client 115. Access point 105 may comprise a primary radio 120 and a secondary radio 125 that may be co-located in access point 105. Access point 105 may allow wireless capable devices (e.g., first client 110 and second client 115) and wired networks to connect wirelessly. Access point 105 may comprise, but is not limited to, a dual access point operating in the 5 GHz band. Access point 105 may operate in any band and is not limited to 5 GHz.

First client 110 and second client 115 may each comprise, but are not limited to, a set-top box, a digital video recorder, a cable modem, a personal computer, a desktop personal computer, a tablet device, or a mobile device for example. The aforementioned are examples and first client 110 and second client 115 may comprise any type of device capable of connecting to an access point 105.

Figure 1B:
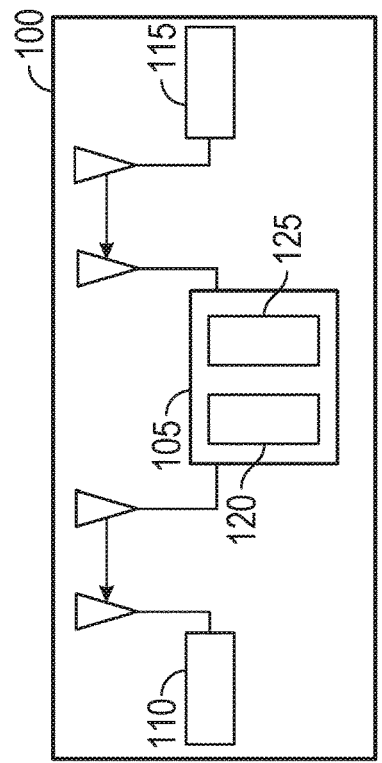

As shown in FIG. 1A, primary radio 120 may be transmitting, for example, at 5180 MHz to first client 110 while secondary radio 125 is transmitting, for example, at 5500 MHz to second client 115. Also, as shown in FIG. 1B, primary radio 120 may be receiving, for example, at 5180 MHz from first client 110 while secondary radio 125 is receiving, for example, at 5500 MHz from second client 115. With the example shown in FIG. 1A and FIG. 1B, when access point 105 transmits simultaneously on both radios (e.g., primary radio 120 and secondary radio 125) with far enough frequency separation (e.g., 5180 MHz and 5500 MHz), there may not be a cross-radio noise floor degradation problem. Also, if either of the radios (e.g., primary radio 120 and secondary radio 125) is not transmitting or receiving, there may not be a cross-radio noise floor degradation problem.

Figure 1C:
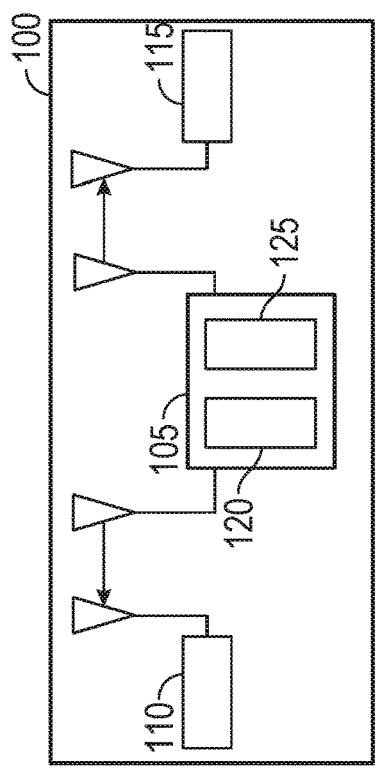
Figure 1D:
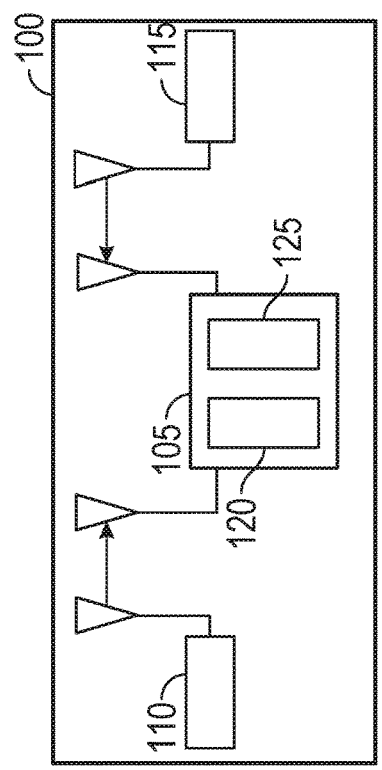

As shown in FIG. 1C, primary radio 120 may be receiving, for example, at 5180 MHz from first client 110 while secondary radio 125 is transmitting, for example, at 5500 MHz to second client 115. Also, as shown in FIG. 1D, primary radio 120 may be transmitting, for example, at 5180 MHz to first client 110 while secondary radio 125 is receiving, for example, at 5500 MHz from second client 115. With the example shown in FIG. 1C and FIG. 1D, if one of access point 105's radios is transmitting (e.g., secondary radio 125 in FIG. 1C and primary radio 120 in FIG. 1D) while the other is receiving (e.g., primary radio 120 in FIG. 1C and secondary radio 125 in FIG. 1D), the receiving radio may subject to being overdriven or increased noise floor. Consequently, there may be a cross-radio noise floor degradation problem in the examples shown in FIG. 1C and FIG. 1D.

The cross-radio noise floor degradation problem may exist in the examples shown in FIG. 1C and FIG. 1D for two reasons. First, this may be because when the receiving radio is hit with higher power (i.e., less isolation) signals, the receiving radio may become overdriven and may not receive anything. This may exist even when the radios are at their furthest frequency separation. Second, this may be because, at lower interference powers (i.e., medium isolation), the other radios transmit noise floor is high enough to impact the NF of the other radio. This also may exist even when the devices are at their furthest frequency separation.

Figure 2:
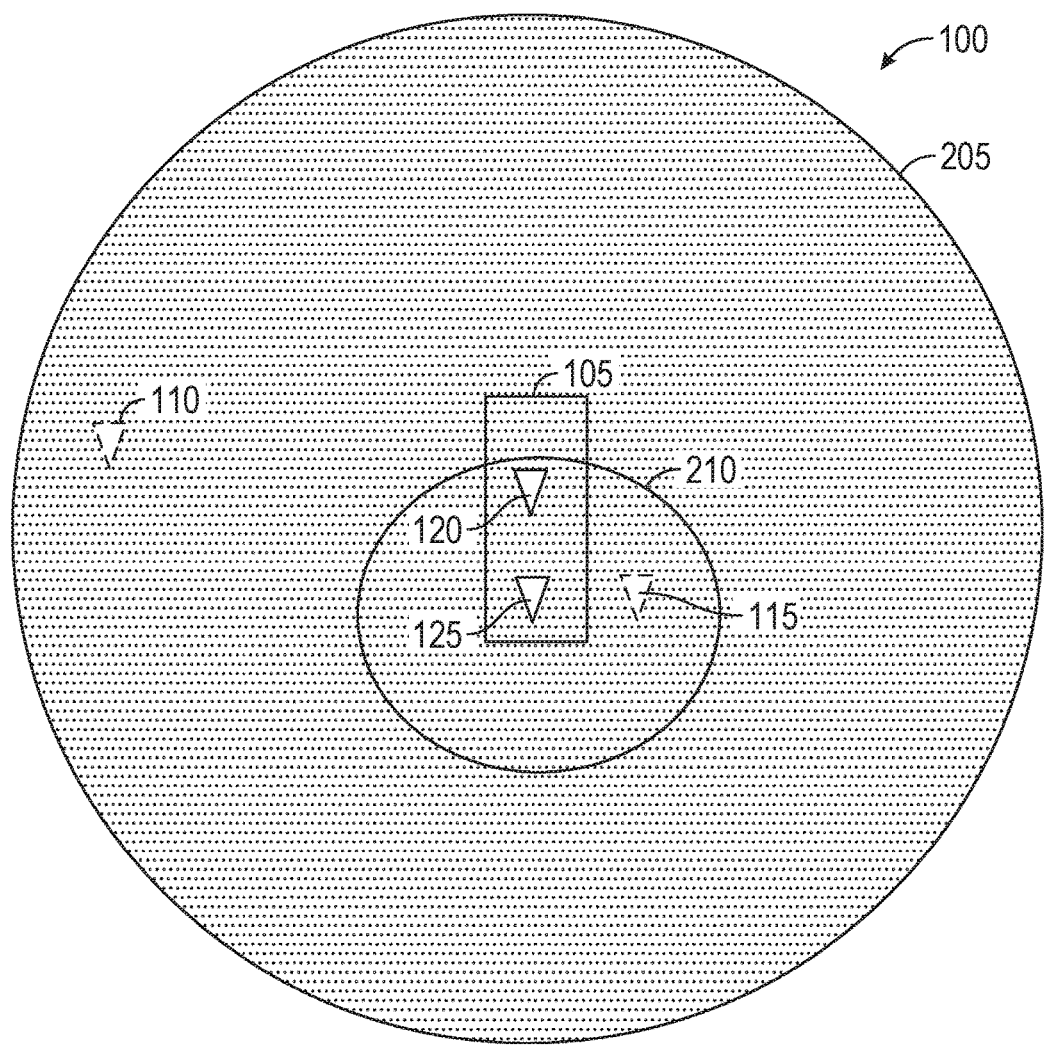
FIG. 2 shows another view of the access point operating environment.

FIG. 2 shows another view of access point operating environment 100. As shown in FIG. 2, the cross-radio noise floor degradation problem may be addressed by dropping the power of one of the radios (e.g., primary radio 120 or secondary radio 125). In other words, if the power is dropped on one of the radios, the amount of NF impact to the other radio on its uplink may be reduced. This may align the transmit (Tx)/receive (Rx) range for both radios and may create a scenario where access point operating environment 100 may have a high density radio and a full range radio. The power may be dropped on the high density radio. For example, as shown in FIG. 2, primary radio 120 may comprise the full range radio serving a macro cell 205 and secondary radio 125 may comprise the high density radio serving a micro cell 210.

As shown in FIG. 2, first client 110 may be outside micro cell 210 and within macro cell 205 and served by primary radio 120. Second client 115 may be within macro cell 205 and micro cell 210 and served by secondary radio 125. Consistent with embodiments of the disclosure, primary radio 120 of access point 105 may be operated at the normal radio resource management (RRM) defined power to cover macro cell 205. Secondary radio 125 of access point 105 may be operated at a reduced power (e.g., the lowest possible Tx power) in order to address a smaller high density area comprising micro cell 210 within macro cell 205. This may allow the full coverage of macro cell 205 by primary radio 120 and additional capacity delivered to a location that may need it covered by micro cell 210. However, because primary radio 120 may be operating at high power, clients (e.g., second client 115) associated to secondary radio 125 at the edge of micro cell 210 may encounter problems sending packets to secondary radio 125. As discussed below with respect to FIG. 3, embodiments of the disclosure may mitigate secondary radio 125's edge connection problem.

Figure 3:
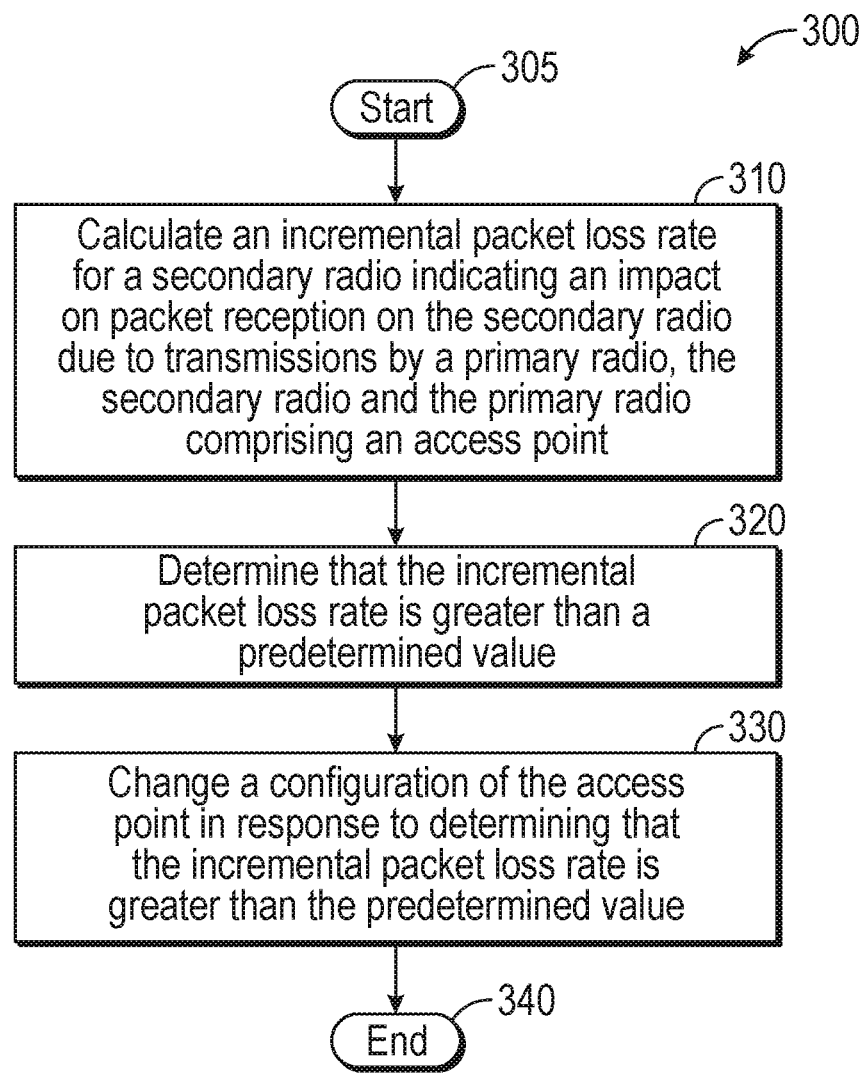
FIG. 3 is a flow chart of a method for providing noise floor degradation detection.

FIG. 3 is a flow chart setting forth the general stages involved in a method 300 consistent with an embodiment of the disclosure for providing noise floor degradation detection. Method 300 may be implemented using a computing device 400 disposed in access point 105 and as described in more detail below with respect to FIG. 4. Method 300 may be implemented by other devices and is not limited to being implemented by computing device 400. Ways to implement the stages of method 300 will be described in greater detail below.

Method 300 may begin at starting block 305 and proceed to stage 310 where computing device 400 may calculate an incremental packet loss rate for secondary radio 125 indicating an impact on packet reception on secondary radio 125 due to transmissions by primary radio 120. For example, reception errors due to cross-radio noise floor degradation may comprise CRC errors on a radio. CRC errors that occur on secondary radio 125's receiver at the same time that primary radio 120's transmitter is active may potentially be due to primary Tx driven noise floor degradation on secondary radio 125's receiver. CRC errors occurring on secondary radio 125's receiver at other times may not be due to primary radio 120's transmitter. By synchronizing clocks in access point 105 across the two radios (e.g., primary radio 120 and secondary radio 125), embodiments of the disclosure may track CRC errors on secondary radio 125 occurring on and off transmit events of primary radio 120. The ratio of on verses off may indicate the impact of primary radio 120's Tx on secondary radio 125's Rx.

CRC errors may be tracked globally (e.g., for all clients on access point 105) by looking at the ratio of CRC occurring during the co-radio Tx events. CRC errors can also be tracked per client on access point 105 by looking at partial verses full Aggregated MAC Protocol Data Unit (AMPDU) reception on secondary radio 125 verses transmit events on primary radio 120. Embodiments of the disclosure may also track Request to Send/Clear to Send (RTS/CTS) failures in a similar way per client. In addition, packets received on secondary radio 125 per client and total on and off of primary radio 120's Tx events may be used.

As stated above, the global impact to packet reception may be used to track CRC errors globally. For example, the global impact of Tx_primary (e.g., transmit of primary radio 120) on Rx_secondary (e.g., receive on secondary radio 125) globally may be: incremental_packet_loss_rate=(CRC_on/(Rx_on+CRC_on)−CRC_off/(Rx_off+CRC_off)) where CRC_on may be CRC errors on secondary radio 125 occurring during a primary radio 120 Tx event and CRC_off may be CRC errors on secondary radio 125 not occurring during a primary radio 120 Tx event. Rx_on may be packets successfully received on secondary radio 125 during a primary radio 120 Tx event. Rx_off may be packets successfully received on secondary radio 125 not during a primary radio 120 Tx event.

Failed RTS/CTS may be tracked on a per client basis. For example, incremental_packet_loss_rate_per_client=(failedCTS_on/rts_on−failedCTS_off/RTS_off). FailedCTS_on may comprise failed RTS/CTS occurring on secondary radio 125 when primary radio 120 is transmitting during expected CTS (e.g., any time after RTS transmission to CTS timeout). RTS_on may comprise RTS occurring right before primary transmission (e.g., meets criteria in failedCTS designation). FailedCTS_off may comprise failed CTS where no primary transmission occurs between RTS transmission and CTS timeout. RTS_off may comprise the number of RTS sent when no primary radio 120 Tx occurs between RTS Tx and CTS timeout or reception.

Embodiments of the disclosure may include estimating per client tracking with data traffic. When receiving an AMPDU from a client, embodiments of the disclosure may track CRC from noise floor (NF) degradation on a per client basis. This may be a rough estimate because embodiments of the disclosure may infer about the number of successful MPDUs received. Some ways to use AMPDUs to estimate the impact of primary radio's Tx on secondary radio 125's Rx may comprise: i) track successfully Rx'd MDPU/AMPDU for the Tx on and Tx off cases (this may rely on the assumption that the AMPDU length should on average be the same in both cases if there is no degradation; and ii) track number of missed BA/BA timeouts happening when primary radio 120's Tx occurs during expected BA reception period.

From stage 310, where computing device 400 calculates the incremental packet loss rate for secondary radio 125 indicating the impact on packet reception on secondary radio 125 due to transmissions by primary radio 120, method 300 may advance to stage 320 where computing device 400 may determine that the incremental packet loss rate is greater than a predetermined value. For example, as second client 115 moves near the outer border of micro cell 210, the incremental packet loss rate may approach or may become greater than the predetermined value. In other words, second client 115 may be associated with second radio 125. However, as second client 115 moves near and even beyond the outer edge of micro cell 210, the incremental packet loss rate may become greater than a predetermined value because primary radio 120 may be over powering secondary radio 125 for second client 125 when second client 125 is near or even beyond the outer edge of micro cell 210.

Once computing device 400 determines that the incremental packet loss rate is greater than a predetermined value in stage 320, method 300 may continue to stage 330 where computing device 400 may change a configuration of access point 105 in response to determining that the incremental packet loss rate is greater than the predetermined value. For example, embodiments of the disclosure may use the incremental_packet_loss_rate to drive the configuration of access point 105. For example, after noise floor driven CRC error is estimated, the data may be used to drive several decisions on access point 105.

Consistent with embodiments of the disclosure, any clients on secondary radio 125 with too high of a level of CRC errors due to NF degradation may be switched to associate to primary radio 120. For example, because primary radio 120 may be over powering secondary radio 125 for second client 125 when second client 125 is near or even beyond the outer edge of micro cell 210 (e.g., as indicated by exceeding the predetermined value), second client 125 may be switched to associate to primary radio 120 when second client 125 is near or even beyond the outer edge of micro cell 210.

Consistent with embodiments of the disclosure, for clients (e.g., first client 110) associated to primary radio 120, secondary radio 125 may snoop on packets from clients associated to primary radio 120 for metrics. If the metrics look good, secondary radio 125 may prompt a switching of first client 110 from primary radio 120 to secondary radio 125. For example, first client 110 may move from beyond the border of micro cell 210 to being within micro cell 210. This may occur when there is a heavy load on primary radio 120 and rebalancing may be helpful to capacity. Once computing device 400 changes the configuration of access point 105 in stage 330, method 300 may then end at stage 340.

An embodiment consistent with the disclosure may comprise a system for providing noise floor degradation detection. The system may comprise a memory storage and a processing unit coupled to the memory storage. The processing unit may be operative to calculate an incremental packet loss rate for a secondary radio indicating an impact on packet reception on the secondary radio due to transmissions by a primary radio. The secondary radio and the primary radio may comprise an access point. The processing unit may be operative to determine that the incremental packet loss rate is greater than a predetermined value. In addition, the processing unit may be operative to change a configuration of the access point in response to determining that the incremental packet loss rate is greater than the predetermined value.

Another embodiment consistent with the disclosure may comprise a system for providing noise floor degradation detection. The system may comprise a memory storage and a processing unit coupled to the memory storage. The processing unit may be operative to calculate, for a secondary radio, an incremental packet loss rate corresponding to a client associated to the secondary radio. The incremental packet loss rate may indicate an impact on packet reception on the secondary radio due to transmissions by a primary radio. The secondary radio and the primary radio may comprise an access point. In addition, the processing unit may be operative to determine that the incremental packet loss rate is greater than a predetermined value and to move the client associated to the secondary radio to be associated with the primary radio in response to determining that the incremental packet loss rate is greater than the predetermined value.

Figure 4:
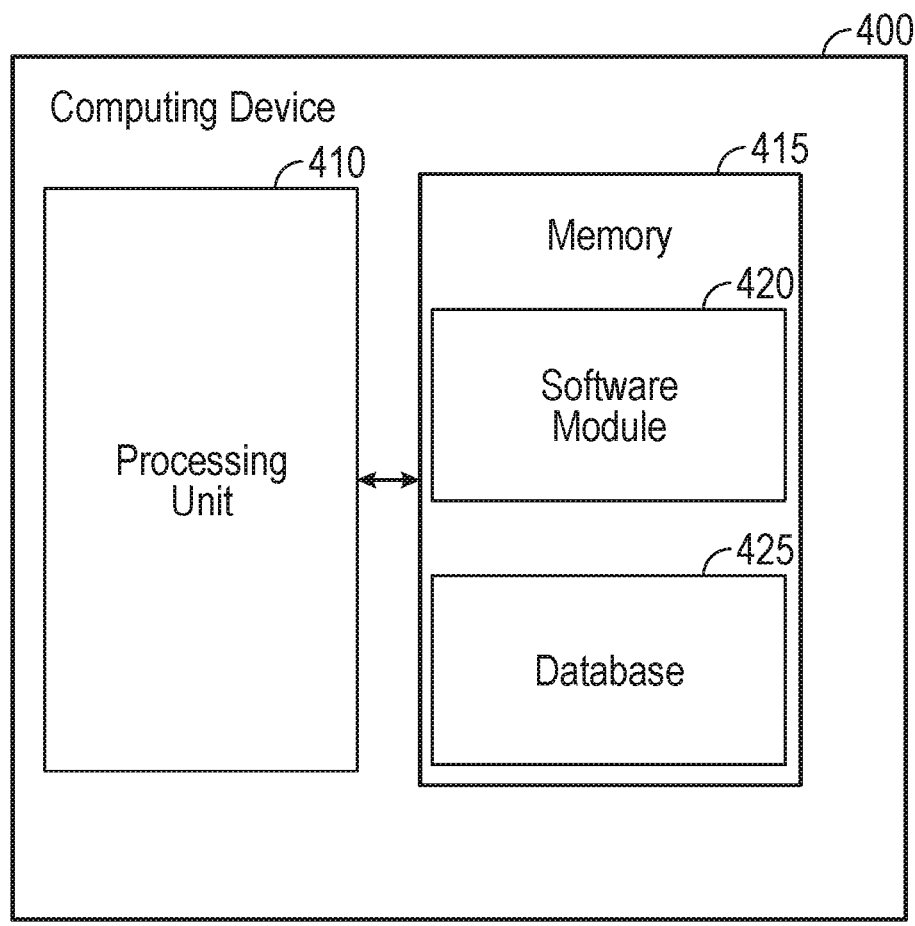
FIG. 4 shows a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform processes for providing noise floor degradation detection, including for example, any one or more of the stages from method 300 described above with respect to FIG. 3. Computing device 400, for example, may provide an operating environment for access point 105. Access point 105 may operate in other environments and is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   calculating an incremental packet loss rate for a secondary radio indicating an impact on packet reception on the secondary radio due to transmissions by a primary radio, the secondary radio and the primary radio comprising an access point, wherein calculating the incremental packet loss rate comprises:
   determining a first cyclic redundancy check (CRC) error that occurs on a receiver associated with the secondary radio when a transmitter associated with the primary radio is active,
   determining a second CRC error that occurs on the receiver associated with the secondary radio at a time when a transmitter associated with the primary radio is not active, and
   determining the incremental packet loss rate based on the first CRC error and the second CRC error;
   determining that the incremental packet loss rate is greater than a predetermined value; and
   changing a configuration of the access point in response to determining that the incremental packet loss rate is greater than the predetermined value, wherein changing the configuration of the access point comprises:
   moving a first client associated with the secondary radio to the primary radio,
   snooping, by the secondary radio, on packets from a second client associated with the primary radio, and
   moving, in response to snooping on the packets from the second client associated with the primary radio, the second client from the primary radio to the secondary radio.

2. The method of claim 1, wherein calculating the incremental packet loss rate for the secondary radio indicating the impact on packet reception on the secondary radio due to transmissions by the primary radio comprises calculating the incremental packet loss rate for the secondary radio indicating the impact on packet reception on the secondary radio due to transmissions by the primary radio corresponding to a macro cell.

3. The method of claim 2, wherein calculating the incremental packet loss rate for the secondary radio indicating the impact on packet reception on the secondary radio due to transmissions by the primary radio comprises calculating the incremental packet loss rate for the secondary radio corresponding to a micro cell within the macro cell.

4. The method of claim 1, wherein calculating the incremental packet loss rate for the secondary radio comprises calculating the incremental packet loss rate for the secondary radio on a global basis with respect to clients associated to the secondary radio.

5. The method of claim 1, wherein calculating the incremental packet loss rate for the secondary radio comprises calculating the incremental packet loss rate for the secondary radio on a global basis with respect to clients associated to the secondary radio based on cyclic redundancy check (CRC) errors on the receiver of the secondary radio.

6. The method of claim 1, wherein calculating the incremental packet loss rate for the secondary radio comprises calculating the incremental packet loss rate for the secondary radio on a per client basis with respect to clients associated to the secondary radio.

7. The method of claim 1, wherein calculating the incremental packet loss rate for the secondary radio comprises calculating the incremental packet loss rate for the secondary radio on a per client basis with respect to clients associated to the secondary radio based on cyclic redundancy check (CRC) errors on the receiver of the secondary radio.

8. The method of claim 1, wherein calculating the incremental packet loss rate for the secondary radio comprises calculating the incremental packet loss rate for the secondary radio on a per client basis with respect to clients associated to the secondary radio based on partial verses full Aggregated MAC Protocol Data Unit (AMPDU) reception on a receiver of the secondary radio.

9. The method of claim 1, wherein calculating the incremental packet loss rate for the secondary radio comprises calculating the incremental packet loss rate for the secondary radio wherein the transmitter of the primary radio is operating at a different frequency from the receiver of the secondary radio.

10. The method of claim 1, wherein changing the configuration of the access point in response to determining that the incremental packet loss rate is greater than the predetermined value further comprises lowering the transmit power of the primary radio.

11. A system comprising:
a memory storage; and
a processing unit coupled to the memory storage, wherein the processing unit is operative to:
calculate, for a secondary radio, an incremental packet loss rate corresponding to a first client associated to the secondary radio, wherein the processing unit being operative to calculate the incremental packet loss rate comprises the processing unit being operative to:
determine a first cyclic redundancy check (CRC) error that occurs on a receiver associated with the secondary radio when a transmitter associated with a primary radio is active,
determine a second CRC error that occurs on the receiver associated with the secondary radio at a time when a transmitter associated with the primary radio is not active, and
determine the incremental packet loss rate based on the first CRC error and the second CRC error;
determine that the incremental packet loss rate is greater than a predetermined value;
move the first client associated to the secondary radio to be associated with the primary radio in response to determining that the incremental packet loss rate is greater than the predetermined value;
enable the secondary radio to snoop on packets from a second client associated with the primary radio; and
move, in response to snooping on the packets from the second client associated with the primary radio, the second client from the primary radio to the secondary radio.

12. The system of claim 11, wherein the processing unit being operative to calculate the incremental packet loss rate for the secondary radio comprises the processing unit being operative to calculate the incremental packet loss rate for the secondary radio based on cyclic redundancy check (CRC) errors on the receiver of the secondary radio.

13. The system of claim 11, wherein the processing unit being operative to calculate the incremental packet loss rate for the secondary radio comprises the processing unit being operative to calculate the incremental packet loss rate for the secondary radio wherein access point operates in the 5 GHz band.

14. The system of claim 11, wherein the processing unit being operative to calculate the incremental packet loss rate for the secondary radio comprises the processing unit being operative to calculate the incremental packet loss rate for the secondary radio, wherein the transmitter of the primary radio is operating at a different frequency from the receiver of the secondary radio.

15. The system of claim 11, wherein the processing unit being operative to, in response to determining that the incremental packet loss rate is greater than the predetermined value, lower the transmit power of the primary radio.

16. A method comprising:
determining, for a secondary radio, an incremental packet loss rate corresponding to a first client associated to the secondary radio, the secondary radio and a primary radio comprising an access point, wherein determining the incremental packet loss rate comprises:
determining a first cyclic redundancy check (CRC) error that occurs on a receiver associated with the secondary radio when a transmitter associated with the primary radio is active,
determining a second CRC error that occurs on the receiver associated with the secondary radio at a time when a transmitter associated with the primary radio is not active, and
determining the incremental packet loss rate based on the first CRC error and the second CRC error;
determining that the incremental packet loss rate is greater than a predetermined value; and
moving the first client associated to the secondary radio to be associated with the primary radio in response to determining that the incremental packet loss rate is greater than the predetermined value;
snooping, by the secondary radio, on packets from a second client associated with the primary radio; and moving, in response to snooping on the packets from the second client associated with the primary radio, the second client from the primary radio to the secondary radio.

\* \* \* \* \*